G. GLASER.
STRAW HOISTING NET.
APPLICATION FILED AUG. 10, 1910.

980,096.

Patented Dec. 27, 1910.
2 SHEETS—SHEET 1.

WITNESSES:
George Bambay.

INVENTOR
George Glaser
BY
ATTORNEYS

G. GLASER.
STRAW HOISTING NET.
APPLICATION FILED AUG. 10, 1910.
980,096.
Patented Dec. 27, 1910.
2 SHEETS—SHEET 2.
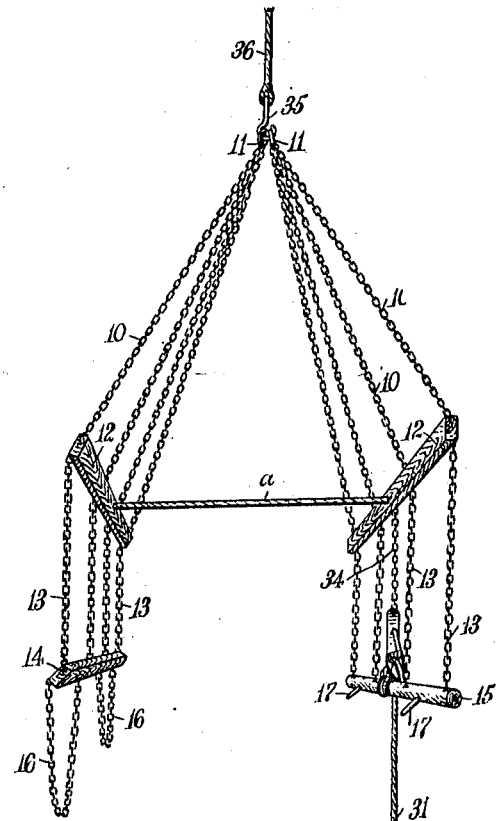
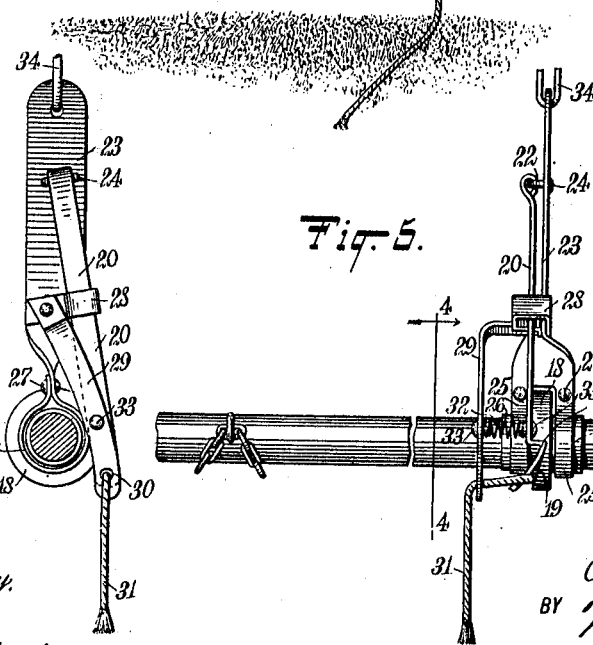
WITNESSES:
INVENTOR
George Glaser
BY
ATTORNEYS

UNITED STATES PATENT OFFICE.

GEORGE GLASER, OF HALLECK, NEVADA.

STRAW-HOISTING NET.

980,096.  Specification of Letters Patent.  Patented Dec. 27, 1910.

Application filed August 10, 1910. Serial No. 576,484.

*To all whom it may concern:*

Be it known that I, GEORGE GLASER, a citizen of the United States, and a resident of Halleck, in the county of Elko and State of Nevada, have invented a new and Improved Straw-Hoisting Net, of which the following is a full, clear, and exact description.

Among the principal objects which the present invention has in view are: To provide a hoisting net of the character mentioned, having locking devices connected therewith for holding the structure in holding position while carrying the load; and to provide a simple, efficient and durable locking device for holding the net in carrying position.

One embodiment of the present invention is disclosed in the structure illustrated in the accompanying drawings, in which like characters of reference denote corresponding parts in all the views, and in which—

Figure 1:
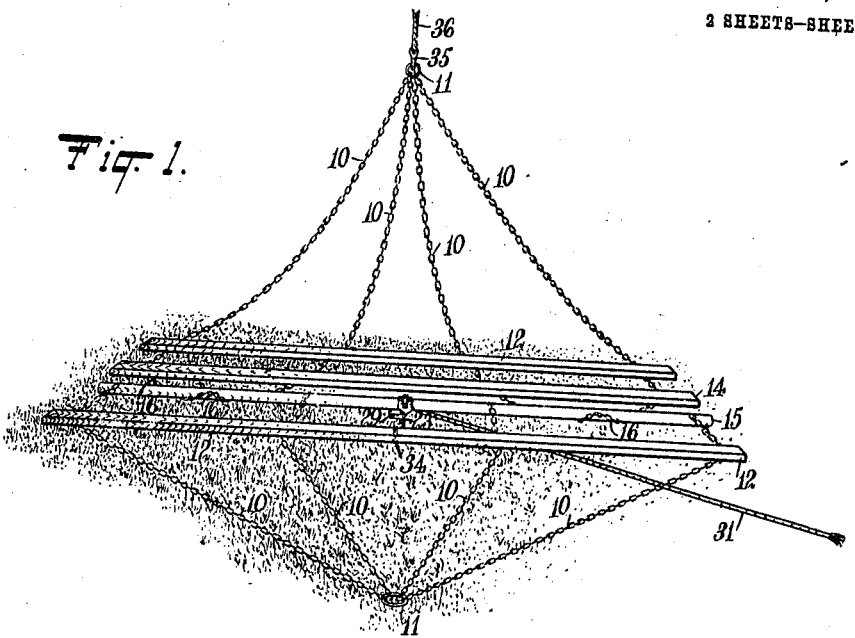
Figure 2:
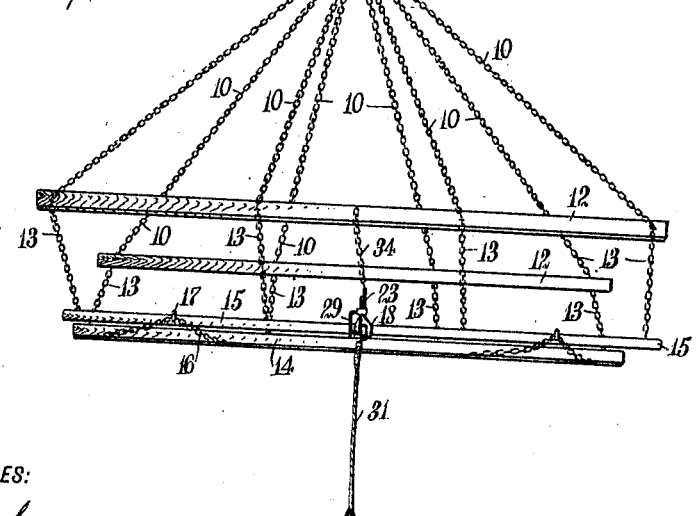

Figure 1 is a perspective view showing the net in its outstretched and receiving position; Fig. 2 is a perspective view showing the net in its holding position; Fig. 3 is a perspective view showing the net in the discharging position; Fig. 4 is a detail view, on an enlarged scale and in section, taken on the line 4—4 in Fig. 5, of the holding latch for the tripping bar of the net; and Fig. 5 is a detail view, on an enlarged scale, showing a fragment of the releasing bar of the net and the latch for locking the same.

The net illustrated in the accompanying drawings is used in conjunction with hoisting derricks employed on farms for lifting the hay or straw in volume to be deposited on the top of a rick. The nets are constructed from short chain sections 10, 10, which are converged and joined to hook rings 11, 11 at the one end, and are suitably fastened to cross bars 12, 12 constructed of wood or any suitable material to confrom to any desired length. The cross bars 12, 12 are connected by a series of chains 13, 13 with a cross bar 14 on the one half of the net, and a rocking bar 15 on the opposite half of the net. In its receiving position the net halves are joined by loop chains 16, 16, the loop ends whereof are passed over and around pins 17, 17 extended from the side of the rocking bar 15. It is in order to hold the chains 16, 16 in position upon the pins 17, 17 that the rocking bar 15 is rotated to a position such as shown in Fig. 2 of the drawings, and is in such position locked. To lock the rocking bar 15 in position there is provided a collar 18 rigidly mounted on the said rocking bar, and provided in the side thereof with a notch 19. To fit within the notch 19 the latch 20 is provided with a head 21. The latch 20 is pivotally mounted at 22 upon a guide plate 23, and by means of a riveted eyelet 24, as shown in Fig. 4 of the drawings. The plate 23 is twisted and bifurcated to form straps 25, 25. The straps 25, 25 are bent around hub flanges 26, 26 extended from the collar 18 to form a bearing for the rotation or rocking of the bar 15. The ends of the straps 25 are riveted at 27, as shown in Figs. 4 and 5 of the drawings.

To guide the latch 20 the plate 23 is provided with a guide loop 28. Extended from the plate 23 and securely riveted thereto is a bracket 29. The bracket 29 is provided with a straight arm extension parallel with the latch 20, and having in the end thereof a perforation 30 through which is reeved a cable 31. The cable 31 is suitably connected with an eyelet in the end of the head 21 of the latch 20. Extended between the latch 20 and the bracket 29 is a spiral spring 32. The spring 32 is anchored upon the shank extensions of bolts 33, 33, as seen particularly in Fig. 5 of the drawings. By means of this construction and arrangement the pull on the cable 31 is exerted in a straight line for the retraction of the latch 20 against the pressure of the spring 32, to withdraw the head 21 from the notch 19, thereby releasing the collar 18 and the bar 15.

The plate 23 is connected by means of a chain 34 with the cross bar 12, being suspended therefrom and maintained in position substantially parallel to the chains 13, 13.

The operation of the invention when constructed and arranged as shown in the accompanying drawings, is as follows: The empty net is lowered to within a few feet of the ground. The chains 16, 16 are, in this position, dangling from the cross bar 14. The rocking bar 15 is rotated, moving the pins 17, 17 outward and upward until the collar 18 is rotated to present the notch 19 to the head 21 of the latch 20. The spring 32 forces the latch head 21 into engagement with the notch 19. In this position it will be noticed that the chains 13, 13 have been partly wound upon the bar 15, so that the weight of the said bar produces an unwinding tendency for the said chains which tends to rotate backward the said bar 15. In this position the loops of the chains 16, 16 are passed over the now upturned pins 17, 17. The net is then lowered until the hook 35 of the hoisting cable 36 is within reach of the operator, when one of the rings 11, 11 is removed from the said hook. The net is now spread upon the ground, in position substantially as shown in Fig. 1 of the drawings, and a stake is driven into the ground through the ring 11 to prevent the rake from pulling the chains 13, 13 and the cross bars while forcing the straw over the said cross bars and the outstretched net. The hay or straw is pushed or advanced over the net by means of any suitable rake, what is known as a sweep rake being preferred. When the load is deposited over the cross bars 12, 14 and 15 and the interposed chains 13, 13, the staked ring 11 is lifted and hooked over the hook 35. It is obvious that when the net is now hoisted by the cable 36, the parts of the net are drawn tightly over the hay or straw confined within the grasp of the flexible members of the net. The load is now hoisted as in operations of similar character, until poised above the rick being stacked. It will be noticed that the weight of the load resting upon the chains 16, 16 exerts a rotative force upon the bar 15, which is held in operative position by means of the latch 20 and the engagement thereof with the collar 18. When the loaded net is properly poised above the rick, the operator draws upon the cable 31, with the result that the latch head 21 is drawn from engagement with the notch 19 of the collar 18, thereby releasing the rocking bar 15, which is instantly rotated to place the pins 17, 17 in a depending position, and from which the loops 16, 16 are then stripped. The loops 16, 16 being released from the pins 17, 17 the two halves of the net open and spread outwardly, dumping the carried load upon the rick.

In Fig. 3 of the drawings I have shown a small rod $a$, as holding the sides of the net in spread relation. This rod $a$ forms no part of the invention, it being an expedient used for the purpose of illustrating the structure.

Having thus described my invention, what I claim as new and desire to secure by Letters Patent is:—

1. A straw hoisting net, comprising a plurality of flexible half sections, said sections being constructed of a series of flexible members permanently united by horizontally disposed spreading bars; a rocking bar rotatively suspended upon one of said half sections; a hanging bearing plate for said rocking bar; a collar fixedly mounted on said rocking bar having a recess formed in the side thereof; a latch head pivotally mounted on said bearing plate and adapted to engage said collar and the recess therein; means embodying a flexible pull member for releasing said latch from said collar; a plurality of pins extended from said rocking bar; and a plurality of flexible loop members permanently mounted upon the lower cross bar of the opposite half section, adapted to engage the said pins on said rocking bar.

2. A straw hoisting net, comprising a plurality of flexible half sections, said sections being constructed of a series of flexible members permanently united by horizontally disposed spreading bars; a rocking bar rotatively suspended upon one of said half sections; a hanging bearing plate for said rocking bar; a collar fixedly mounted on said rocking bar having a recess formed in the side thereof; a latch head pivotally mounted on said bearing plate and adapted to engage said collar and the recess therein; a guiding bracket mounted on said bearing plate and extended in parallel relation with said latch, said bracket having a guiding eyelet formed in the end thereof opposite the end of said latch; means embodying a flexible pull member for releasing said latch from said collar; a plurality of pins extended from said rocking bar; and a plurality of flexible loop members permanently mounted upon the lower cross bar of the opposite half section, adapted to engage the said pins on said rocking bar.

3. A straw hoisting net, comprising a plurality of flexible half sections, said sections being constructed of a series of flexible members permanently united by horizontally disposed spreading bars; a rocking bar pivotally suspended upon one of said half sections; a hanging bearing plate for said rocking bar; a collar fixedly mounted on said rocking bar having a recess formed in the side thereof; a latch head pivotally mounted on said bearing plate and adapted to engage said collar and the recess therein; a guiding bracket mounted on said bearing plate and extended in parallel relation with said latch, said bracket having a guiding eyelet formed in the end thereof opposite the end of said latch; a spring mounted between and engaging said bracket and said latch in locked position; means embodying a flexible pull member for releasing said latch from said collar; a plurality of pins extended from said rocking bar; and a plurality of flexible loop members permanently mounted upon the lower cross bar of the opposite half section, adapted to engage the said pins on said rocking bar.

4. A straw hoisting net, comprising a plurality of flexible half sections, said sections being constructed of a series of flexible members permanently united by horizontally disposed spreading bars; a rocking bar pivotally suspended upon one of said half sections; a hanging bearing plate for said rocking bar; a flexible member supporting said bearing plate to maintain the same in vertical extension when the said bar is rotated; a collar fixedly mounted on said rocking bar having a recess formed in the side thereof; a latch head pivotally mounted on said bearing plate and adapted to engage said collar and the recess therein; a guiding bracket mounted on said bearing plate and extended in parallel relation with said latch, said bracket having a guiding eyelet formed in the end thereof opposite the end of said latch; means embodying a flexible pull member for releasing said latch from said collar; a plurality of pins extended from said rocking bar; and a plurality of flexible loop members permanently mounted upon the lower cross bar of the opposite half section, adapted to engage the said pins on said rocking bar.

In testimony whereof I have signed this specification in the presence of two subscribing witnesses.

GEORGE GLASER.

Witnesses:
E. P. CARVILLE,
E. J. L. TABER.